March 5, 1957  C. CASPER  2,783,579
FISHING LURE
Filed March 18, 1954
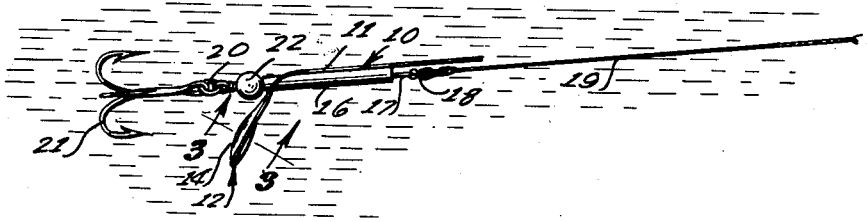
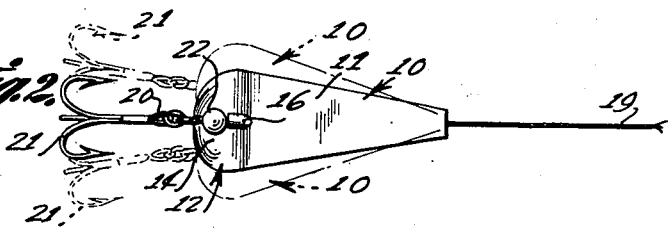
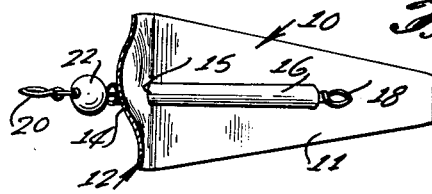
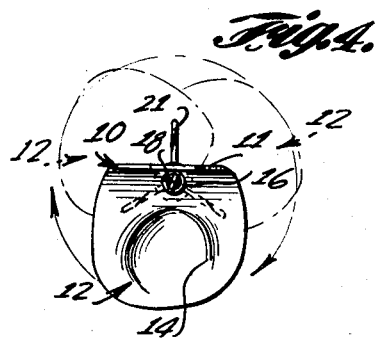
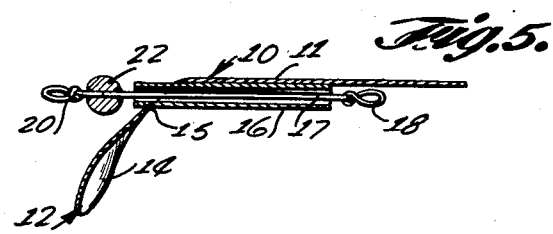
INVENTOR.
Clarence Casper
BY Victor J. Evans & Co.
ATTORNEYS

United States Patent Office 2,783,579
Patented Mar. 5, 1957

2,783,579
FISHING LURE

Clarence Casper, Clatskanie, Oreg.

Application March 18, 1954, Serial No. 417,165

1 Claim. (Cl. 43—42.19)

This invention relates to fishing tackle, and more particularly to a fishing lure.

The object of the invention is to provide a fish lure which will both wobble and spin as it is drawn through the water to thereby provide a highly efficient and seductive lure for fish.

Another object of the invention is to provide a fish lure which has the characteristics of both a wobbler and spinner lure combined, there being a means provided for preventing twisting of the line as the lure spins in the water.

A further object of the invention is to provide a fish lure which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the lure of the present invention being used.

Figure 2 is a top plan view of the lure.

Figure 3 is a sectional view taken on the line 3—3 of Figure 1.

Figure 4 is an end elevational view of the lure of the present invention.

Figure 5 is a longitudinal sectional view taken through the lure.

Referring in detail to the drawings, the numeral 10 designates a body member which can be made of any suitable material such as metal or plastic, and the body member 10 includes a flat portion that defines a shank 11. The side edges of the shank 11 converge forwardly as shown in Figures 2 and 3 so that the lure has the shape as shown in Figures 2 and 3.

Formed integral with the shank 11 or secured thereto is a lip 12 which is arranged angularly with respect to the shank. The lip 12 is provided with a recess or indentation 14, and as shown in Figure 4 the indentation 14 is offset from the center of the lip 12. Thus, as the lure is drawn through the water by means of the line 19, the water will impinge against the recess 14 to thereby cause the lure to rotate or spin to thus attract fish.

The lip 12 is provided with a circular opening 15, and projecting through the opening 15 is a hollow elongated tube 16. The tube 16 is secured to the body member 10 in any suitable manner, as for example by soldering or welding. Extending longitudinally through the tube 16 is a rod 17 which has an eyelet 18 on its front end for attachment to the fishing line 19. An eye 20 is formed on the rear end of the rod 17, and one or more fishhooks 21 are adapted to be connected to the eye 20. A bead or ball 22 is secured to the rod 17, and the bead 22 prevents the parts from becoming entangled and ensures that the tube 16 and body member 10 can freely rotate on the rod 17.

From the foregoing it is apparent that there has been provided a fish lure which will both wobble and spin as it is drawn through the water. The wobbling motion is illustrated in Figure 2 whereby the parts move from the solid line position of Figure 2 to the broken line position of Figure 2 as the lure is drawn through the water by the line 19. In Figure 4 the spinning of the lure is illustrated wherein the parts move in the direction of the arrows from the solid to the dotted or broken line position and back to the solid line position. The spinning action of the lure results from the water impinging against the offset indentation 14 which thus causes the body member 10 and tube 16 to rotate about the rod 17. The fishhook 21 is connected to the eyelet 20 while the fishing line 19 is connected to the eyelet 18.

The lure can be made of any suitable material such as metal, plastic or any other material and the present invention has the characteristics of both a wobbler and spinner combined in one. The portion of the shank 11 which projects forwardly of the tube 16 produces the wobbling motion while the lip 12 causes the lure to spin. The number of revolutions or speed of rotation of the lure can be controlled by the amount of twist or indentation that is provided in the lip 12. Thus, for lake fishing more twist or indentation can be used than in running water. The bead 22 permits the lure to spin without causing the fish line to twist and tangle. By having a lip of greater or less length the spinning can be controlled, and by increasing or decreasing the length of that portion of the shank 11 extending forwardly of the tube 16, the amount of wobbling can be controlled. The indentation or recess 14 also helps to stabilize the lip and causes the lure to spin.

I claim:

In a fishing lure, a body member provided with a flat section defining a shank, said shank being tapered so that the side edges of said shank are arranged in converging relation with respect to each other, a lip extending from the rear end of said shank and arranged angularly with respect thereto, said lip having a curved outer edge, there being an indentation in said lip, said lip being provided with a circular opening, said opening being arranged adjacent said shank, a hollow open ended tube extending through the opening in said lip and secured to said body member, the front of said tube being spaced rearwardly from the front end of said shank, a rod extending longitudinally through said tube and having an eyelet on its front end for engagement with a fishing line, said rod being longer than said tube, an eye on the rear end of said rod for engagement with a fish hook, and a ball secured to said rod and interposed between said tube and eye.

References Cited in the file of this patent

UNITED STATES PATENTS

| | | |
|---|---|---|
| 967,660 | Pedersen | Aug. 16, 1910 |
| 1,002,785 | Telford | Sept. 5, 1911 |
| 1,395,533 | Tuttle | Nov. 1, 1921 |
| 1,598,958 | Crosby | Sept. 7, 1926 |
| 1,758,344 | Wright et al. | May 13, 1930 |
| 2,463,889 | Lundemo | Mar. 8, 1949 |
| 2,698,494 | Larsen | Jan. 4, 1955 |

FOREIGN PATENTS

| | | |
|---|---|---|
| 55,193 | France | Apr. 25, 1951 |